US010412244B2

United States Patent
Kuno

(10) Patent No.: US 10,412,244 B2
(45) Date of Patent: Sep. 10, 2019

(54) INFORMATION PROCESSING APPARATUS, COMPUTER-READABLE MEDIUM AND INFORMATION PROCESSING SYSTEM

(71) Applicant: CANON KABUSHIKI KAISHA, Tokyo (JP)

(72) Inventor: Koichi Kuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/007,433

(22) Filed: Jun. 13, 2018

(65) Prior Publication Data

US 2018/0367685 A1 Dec. 20, 2018

(30) Foreign Application Priority Data

Jun. 19, 2017 (JP) ................................. 2017-119890

(51) Int. Cl.
| | |
|---|---|
| *H04N 1/00* | (2006.01) |
| *G06F 9/4401* | (2018.01) |
| *G06F 9/445* | (2018.01) |
| *H04N 1/58* | (2006.01) |

(52) U.S. Cl.
CPC ......... *H04N 1/00514* (2013.01); *G06F 9/445* (2013.01); *G06F 9/4411* (2013.01); *H04N 1/00018* (2013.01); *H04N 1/00034* (2013.01); *H04N 1/00411* (2013.01); *H04N 1/00854* (2013.01); *H04N 1/58* (2013.01)

(58) Field of Classification Search
CPC ............................ H04N 1/00514; G06F 9/445
See application file for complete search history.

(56) References Cited

U.S. PATENT DOCUMENTS

| | | | | |
|---|---|---|---|---|
| 6,003,093 | A | 12/1999 | Kester | |
| 2010/0073494 | A1* | 3/2010 | Hirose | H04N 5/23248 348/208.4 |
| 2010/0223340 | A1* | 9/2010 | Pope | H04N 1/00217 709/206 |
| 2011/0293183 | A1* | 12/2011 | Tan | G06K 9/00993 382/182 |
| 2012/0307300 | A1* | 12/2012 | Takano | H04N 1/00217 358/1.15 |
| 2017/0302807 | A1 | 10/2017 | Kuno | |

FOREIGN PATENT DOCUMENTS

| | | | |
|---|---|---|---|
| JP | 4208278 A | 1/2009 | |
| JP | 4310172 A | 8/2009 | |

\* cited by examiner

*Primary Examiner* — Ibrahim Siddo
(74) *Attorney, Agent, or Firm* — Venable LLP

(57) ABSTRACT

A function which can be executed by an application is determined from information obtained from data obtained within a standard rule, thereby implementing a function within the standard rule. More specifically, processing executed by a scanner is recorded in EXIF information, and the application determines a function to be executed, based on the EXIF information.

22 Claims, 15 Drawing Sheets

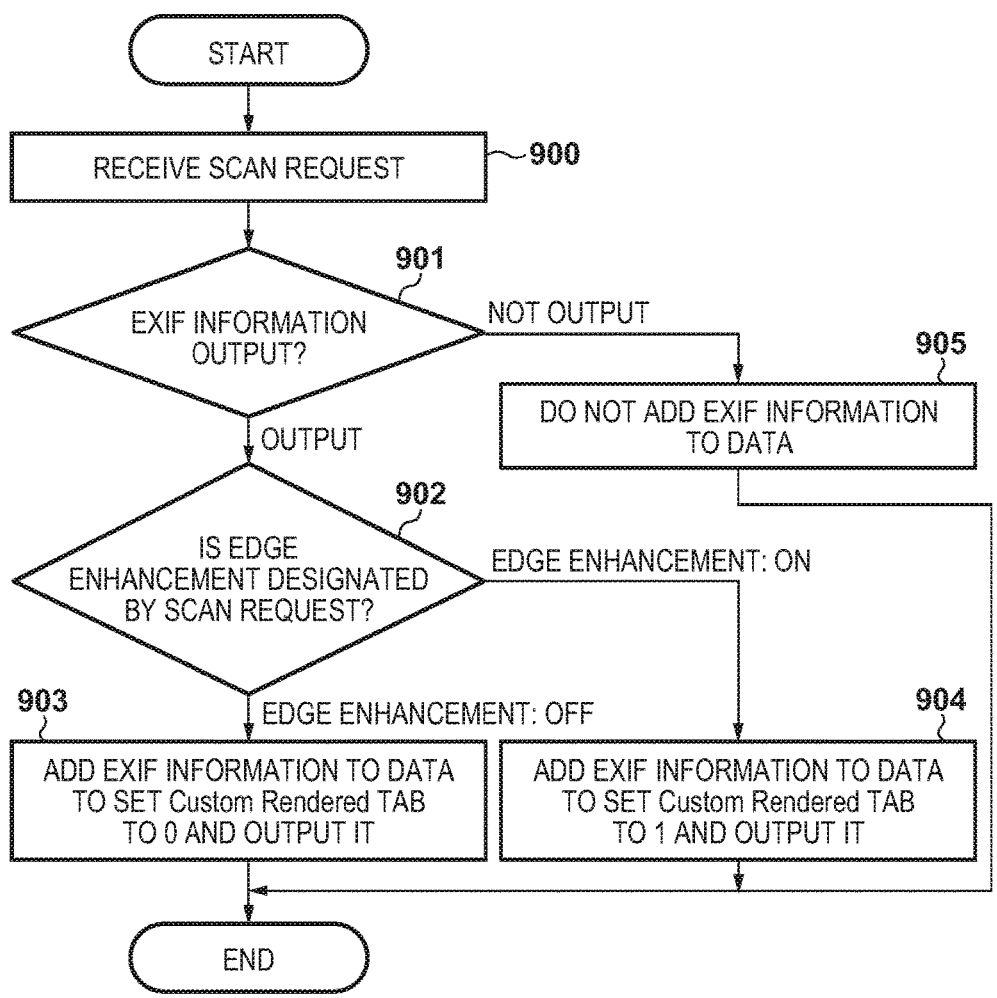

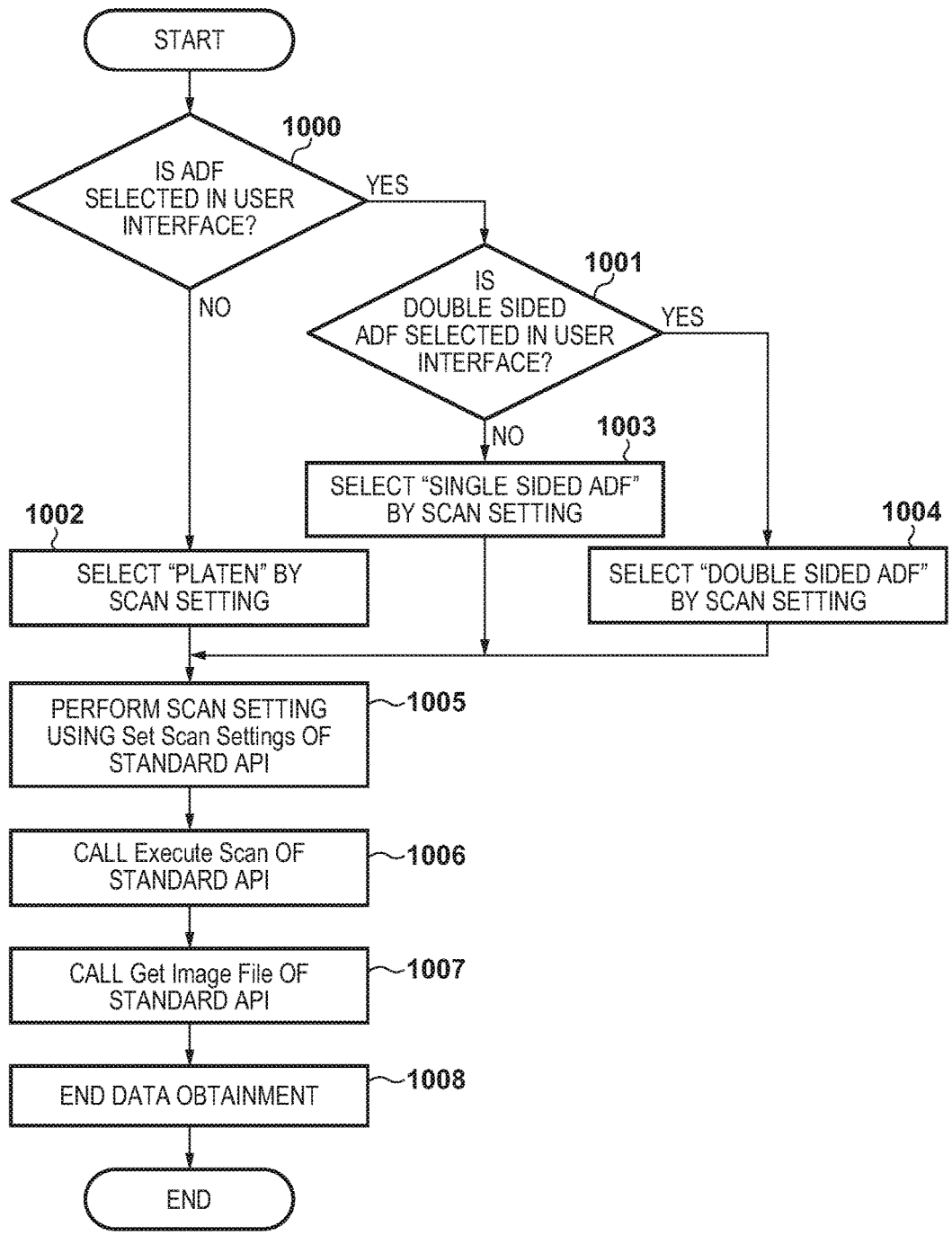

INFORMATION PROCESSING APPARATUS, COMPUTER-READABLE MEDIUM AND INFORMATION PROCESSING SYSTEM

BACKGROUND OF THE INVENTION

Field of the Invention

The present invention relates to an information processing apparatus, a computer-readable medium, and an information processing system for transmitting various kinds of information to an image processing apparatus.

Description of the Related Art

When an application program operating on an operating system (to be referred to as an OS hereinafter) of an information processing apparatus accesses an image processing apparatus such as a scanner, a standard rule determined by an OS maker or standardizing body is used to perform access. The OS maker or standardizing body controls a program called a driver in accordance with a request from the application program to implement access to the image processing apparatus.

There is available, as a driver, a vendor driver created by a vendor that provides the image processing apparatus. The vendor driver complies with the standard rule but can include unique processing. For example, a TWAIN serving as the scanner standard rule includes a Custom Capability function as a function extension. The vendor defines this in the vendor driver to implement a unique function. The unique function can be used from the application program.

Not the vendor driver but a standard driver prepared by the OS maker is often used due to the recent security problem and shortening of the upgrading period of the OS. The standard driver includes only basic functions and cannot support the function unique to the vendor. As a result, there is fear of a shortage of functions of the standard driver.

There are proposed several methods of extending the function using the standard driver. For example, Japanese Patent No. 4208278 proposes processing of adding image processing by an image manager and converting the resultant data via a TWAIN protocol manager in response to a request from a TWAIN stub data source via a user interface manager and via the actual TWAIN protocol manager. The actual data transfer when viewed from the application program complies with the TWAIN protocol. However, since the mechanism except TWAIN control overlaps with the stub, implementation falls outside the standard rule range when viewed from the OS.

In Japanese Patent No. 4310172(B2), an extended interface for exchanging setting information unique to a device driver between the device driver and an application is implemented by the interface of an operating system. A setting screen capable of performing setting based on the setting information unique to the device driver is displayed. This extended interface is another program which is not defined within the standard rule. The extended interface is not a measure for solving the function extension by only the standard protocol and the standard driver.

As described above, the function extension cannot be performed within the range of the standard rule. The extension function of the vendor may not be used in an environment in which the standard protocol exists and the standard driver is provided. Use of the function extension becomes possible by using the vendor driver or using the technique described in the related art.

An image processing apparatus such as a scanner has a lower processing capability than a host computer or the like and is poor in processing flexibility because its program is an embedded program. For this reason, image processing itself tends to be executed by the host computer or the like having a higher flexibility and a higher processing capability.

However, assume that image processing exceeding the standard image processing is performed in the image processing apparatus such as a scanner. In this case, when an application performs further image processing, the image quality may degrade. For example, in order to prevent this, the application must know whether the image data obtained from the image processing apparatus has already undergone image processing exceeding the standard image processing. Although use of the vendor driver allows obtainment of designation of image processing for the image processing apparatus, use of the standard driver may not allow the application to know this. For this reason, the function of executing processing using the image processing apparatus may not be appropriately determined in the information processing apparatus using the image processing apparatus.

SUMMARY OF THE INVENTION

The present invention provides an information processing apparatus, a computer-readable medium, and an information processing system capable of appropriately determining a function to be executed while using a standard driver.

The present invention has the following arrangement. That is, according to the first aspect of the present invention, there is provided an information processing apparatus using an image processing apparatus that transfers, to a request source, together with image data, accompanying information indicating a function to be executed, the apparatus comprising a processor and a memory, wherein the memory stores a program, and the processor executes the program and functions as an obtaining unit configured to obtain the image data and the accompanying information from the image processing apparatus, and a determination unit configured to determine, based on the accompanying information, a function to be executed.

According to another aspect of the present invention, there is provided an information processing system comprising an image processing apparatus and an information processing apparatus using the image processing apparatus, wherein the image processing apparatus includes a transmission unit configured to transmit, to a request source, together with image data in response to a predetermined request, accompanying information indicating a function to be executed, and the information processing apparatus includes an obtaining unit configured to obtain the image data and the accompanying information transmitted to the transmission unit by sending the predetermined request to the image processing apparatus, and a determination unit configured to determine a function to be executed, based on the accompanying information obtained from the obtaining unit.

According to the present invention, the function to be executed can be appropriately determined while using the standard driver.

Further features of the present invention will become apparent from the following description of exemplary embodiments with reference to the attached drawings.

BRIEF DESCRIPTION OF THE DRAWINGS

FIG. 16 is a flowchart at the time of scan in the image processing apparatus 150; and FIG. 17 is a flowchart of scan control in the application program 200.

DESCRIPTION OF THE EMBODIMENTS

Preferred embodiments of the present invention will be described in detail with reference to the accompanying drawings. Note that the following embodiments will not limit the scope of the present invention. All combinations of features described in the embodiments will not indispensably serve as the solving means of the present invention.

In this embodiment, an information processing system including an image processing apparatus such as a scanner and an information processing apparatus using the image processing apparatus will be described. In this information processing apparatus, a vendor driver is not provided and a standard driver must be used in such a case in which, for example, an operating system is changed by upgrading or the like. In addition, a vendor driver is not provided and the standard driver is used depending on the vendor of the image processing apparatus. Some image processing apparatus can perform the designated image processing on the subsequent scan data without performing the designation every time if image processing is not designated every scan and such designation is performed in advance. By using such an image processing apparatus, if, for example, image processing exceeding the standard image processing is designated in the image processing apparatus using the vendor driver under the control of the old operating system, the image processing apparatus can be used using the standard driver at the time of installing a new operating system. In this case, even if the image processing apparatus is used using the standard driver, designated image processing can be performed on the obtained image data. However, the information processing apparatus using the standard driver may not know that the image data has undergone the image processing exceeding the standard image processing. In this case, the function concerning the use of the image processing apparatus may not be appropriately determined.

According to this embodiment, a technique of appropriately determining a function concerning the image processing apparatus while using a standard driver will be described in detail.

First Embodiment

Figure 1:
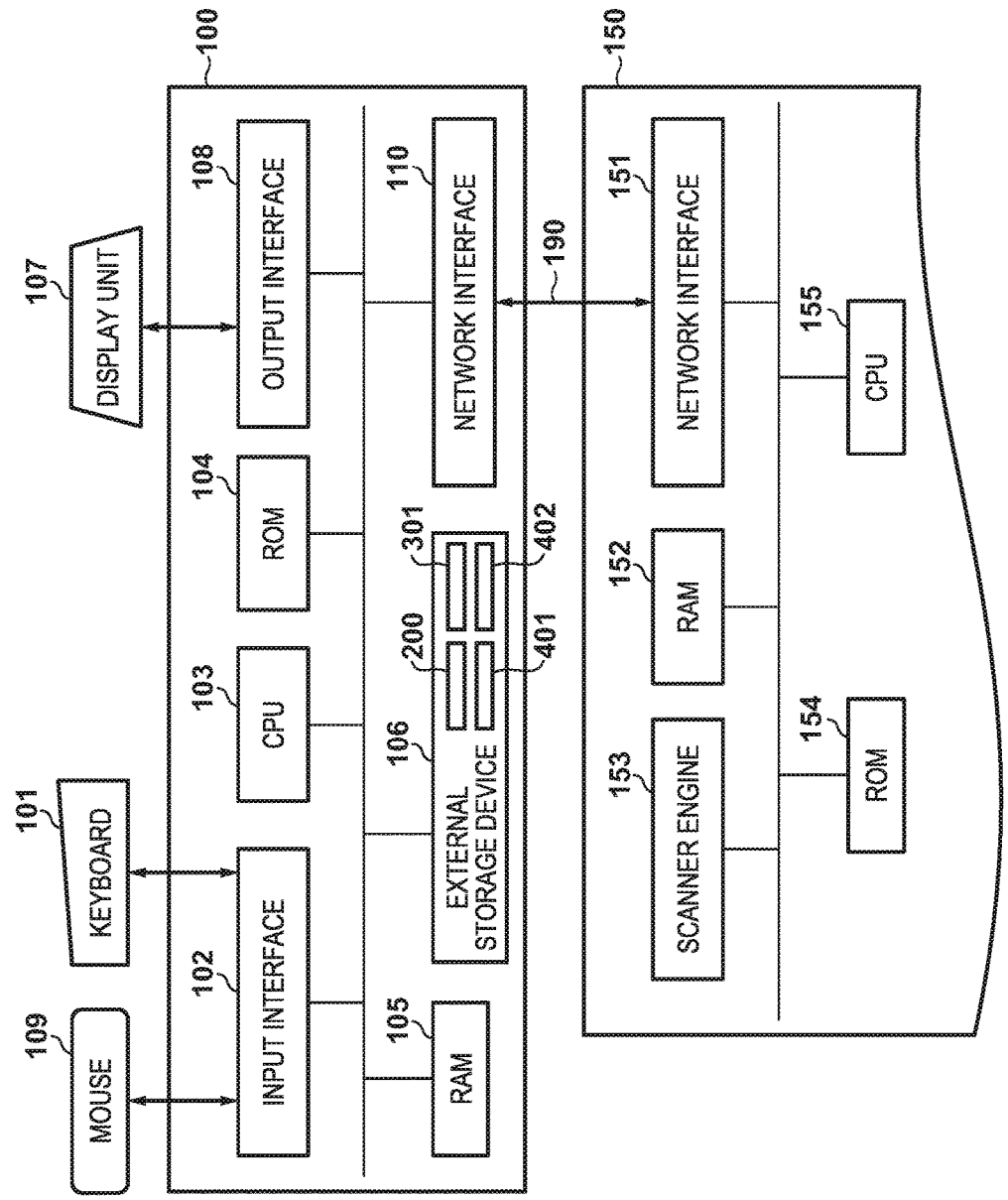
FIG. 1 is a block diagram showing the arrangement of an image processing apparatus 150 and an information processing apparatus 100.

The arrangement of an image processing apparatus 150 and an information processing apparatus 100 according to this embodiment will be described with reference to FIG. 1.

Hardware Arrangement

The information processing apparatus 100 includes an input interface 102, a CPU 103, a ROM 104, a RAM 105, an external storage device 106, an output interface 108, a display unit 107, a keyboard 101, a mouse 109, and a network interface 110. The network interface 110 is connected to the image processing apparatus 150 such as a scanner and a multifunction peripheral including a scanner (both of which will be described later) via a network cable 190. The image processing apparatus 150 reads image data in response to a request and transfers (transmits) the image data together with accompanying data (to be described later) to the request source information processing apparatus 100 (or its application). The ROM 104 stores the initialization program. The external storage device 106 stores an OS (Operating System), an application program 200, a standard library 301, a vendor driver 401, a standard driver 402, and other kinds of data. The RAM 105 is used as a work memory used by various kinds of programs stored in the external storage device 106.

The image processing apparatus 150 includes a network interface 151, a RAM 152, a scanner engine 153, a ROM 154, and a CPU 155. The network interface 151 is connected to the information processing apparatus 100 via the network cable 190. This connection can be performed directly via a cable as shown in FIG. 1 or indirectly via a router or hub. This connection may be performed wirelessly without being through the network cable 190. The RAM 152 is used as a main memory and work memory of the CPU 155 and stores various kinds of data for processing a received scan job. The scanner engine 153 performs scan based on the scan job stored in the RAM 152. The scanner engine 153 is formed from an optical sensor for scan and a motor for driving the sensor. The scanner engine 153 includes an auto document feeder (to be referred to as an ADF hereinafter) for automatically feeding an original to be scanned in addition to a method of placing an original on a platen glass and scanning the original by driving the sensor. The ADFs include a single-sided ADF for reading one side of the original and a double-sided ADF for simultaneously reading two sides of the original using two optical sensors. The processing distribution for the information processing apparatus 100 and the image processing apparatus 150 is illustrated in FIG. 1, but any other form may be employed in place of the above processing distribution.

Software Configuration

Figure 2:
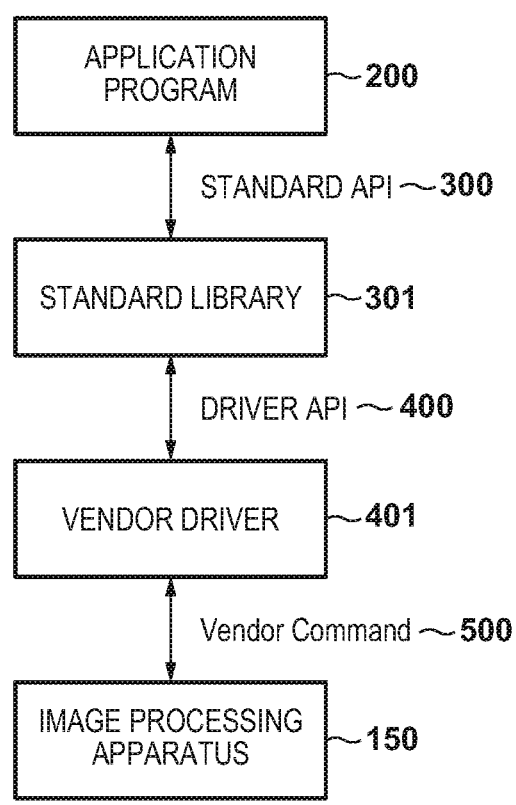
FIG. 2 is a view of the software configuration of a vendor driver 401.

The software configuration of the information processing apparatus 100 is shown in FIG. 2. The above-described information processing apparatus 100 is controlled by the OS described above, and the application program 200 is operated on the OS. The application program 200 is assumed to have a function of obtaining and storing an image from the image processing apparatus 150.

The application program 200 accesses the image processing apparatus 150 such as a scanner using the standard rule determined by the OS maker or standardizing body. The application program 200 can access the image processing apparatus 150 using the standard rule including Application Program Interface (to be referred to as a standard API 300 hereinafter) defined in the standard rule.

Figure 3:
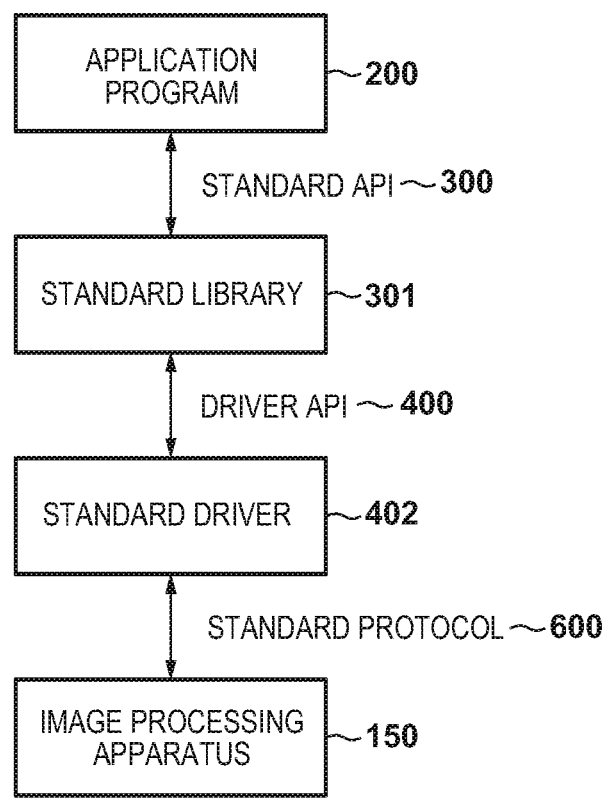
FIG. 3 is a view of the software configuration of a standard driver 402.

When accessing the image processing apparatus 150, the application program 200 embeds the standard library 301 included in the OS in its own program and calls the standard API 300 defined in the standard library 301. In response to calling of the standard API 300, the standard library 301 of the OS loads a driver corresponding to the image processing apparatus 150. The driver accesses the image processing apparatus 150 in accordance with a function desired by a driver API 400, thereby implementing a desired operation. The driver may be the vendor driver 401 created and provided by the vendor, as shown in FIG. 2 or the standard driver 402 which is included in the OS and created by the OS maker and which accesses the image processing apparatus 150 using a standard protocol 600, as shown in FIG. 3. The standard driver 402 is provided by the OS maker in this embodiment, but can be any other driver complying with the standard rule. In addition, a driver not integrally including the standard API 300 and the standard driver 402 may be equally used when viewed from the application program 200.

Figure 4:
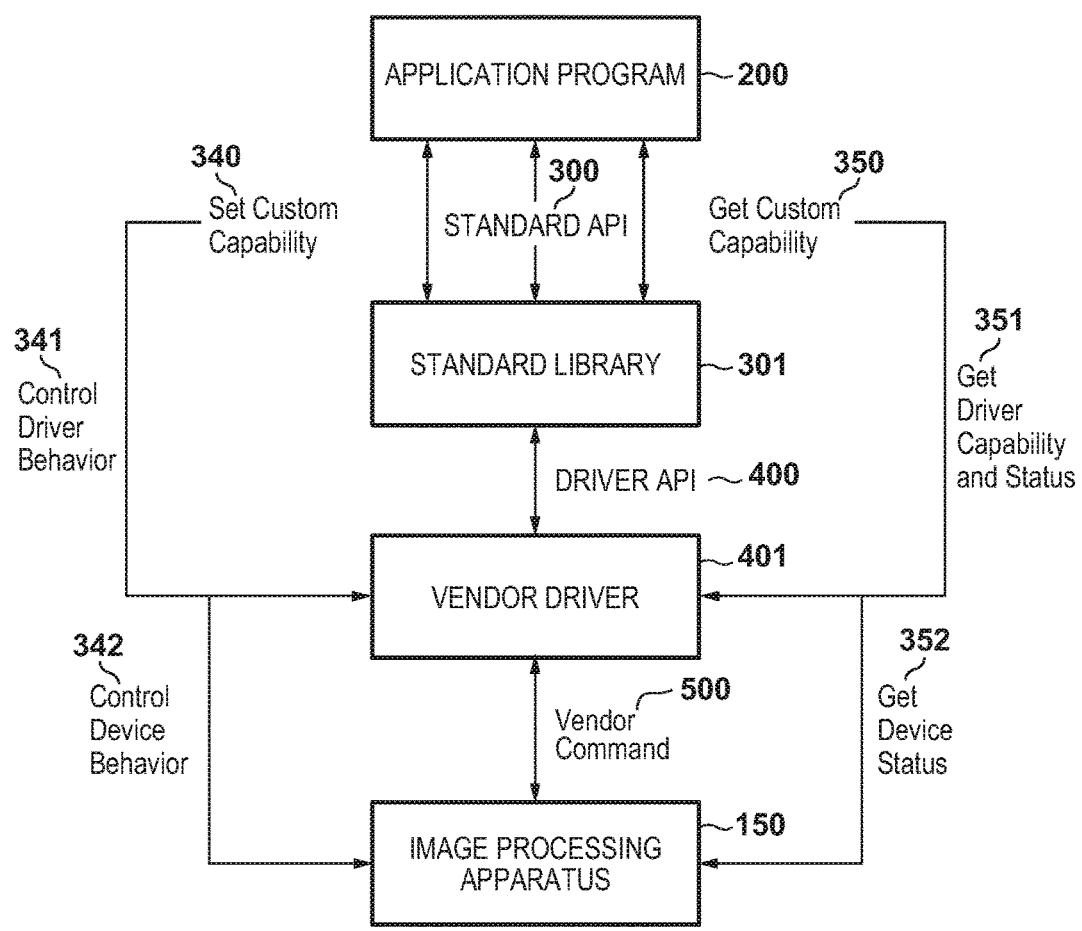
FIG. 4 is a view showing the software configuration of the vendor driver 401 using Custom Capability.

The vendor driver 401 shown in FIG. 2 and the standard driver 402 shown in FIG. 3 have no difference in the range of implementing the standard function when viewed from the application program 200. The application program 200 improves the convenience for the device control provided by the OS standard or improves the function by using the vendor driver 401 and Capability, as shown in FIG. 4. The Capability is, for example, information such as a function unique to the model of the vendor driver. The arrangement in FIG. 4 basically has no difference from the arrangement in FIG. 2. The application program 200 can use Set Custom Capability 340 and Get Custom Capability 350 defined in the standard API 300 to influence the vendor driver 401 which supports the Set Custom Capability 340 and the Get Custom Capability 350. For example, if the application program 200 uses the Get Custom Capability 350, as shown in Get Driver Capability and Status 351, static information, such as the readable size of the image processing apparatus 150, held in the driver 401 without actual communication with the image processing apparatus 150 can be obtained, or fine information exceeding the standard definition can be obtained. If the Set Custom Capability 340 is used immediately before the scan, as shown in Control Driver Behavior 341, the internal operation of the vendor driver 401 is changed such that a subsequent scan instruction can be overwritten. Along with the change in the internal operation of the vendor driver 401, as shown in Control Device Behavior 342 and Get Device Status 352, obtainment of the status of the image processing apparatus 150 itself and command issuance to the image processing apparatus 150 can be indirectly controlled. For example, the Control Device Behavior 342 is set in the image processing apparatus 150 by the Set Custom Capability 340, so that edge enhancement can be performed in the image processing apparatus 150. After the setting, the image processing apparatus 150 performs edge enhancement processing on the image data scanned in accordance with an image scan request.

The Custom Capability is a set value created for each driver as it is indicated by its name and cannot be used in all the image processing apparatuses 150. Only the vender that has created the driver knows the use method of this set value. The vendor discloses the function of the driver by information such as SDK and releases it to developers. The Custom Capability functions are not standardized between the vendors. In addition, since the standard driver 402 does not know the Custom Capability supported by the vendor driver 401, even if the application program 200 designates the processing of the Custom Capability, the designation is neglected or set to be an error by the standard driver 402.

Sequence of Scan Processing Using Standard Driver

Figure 5:
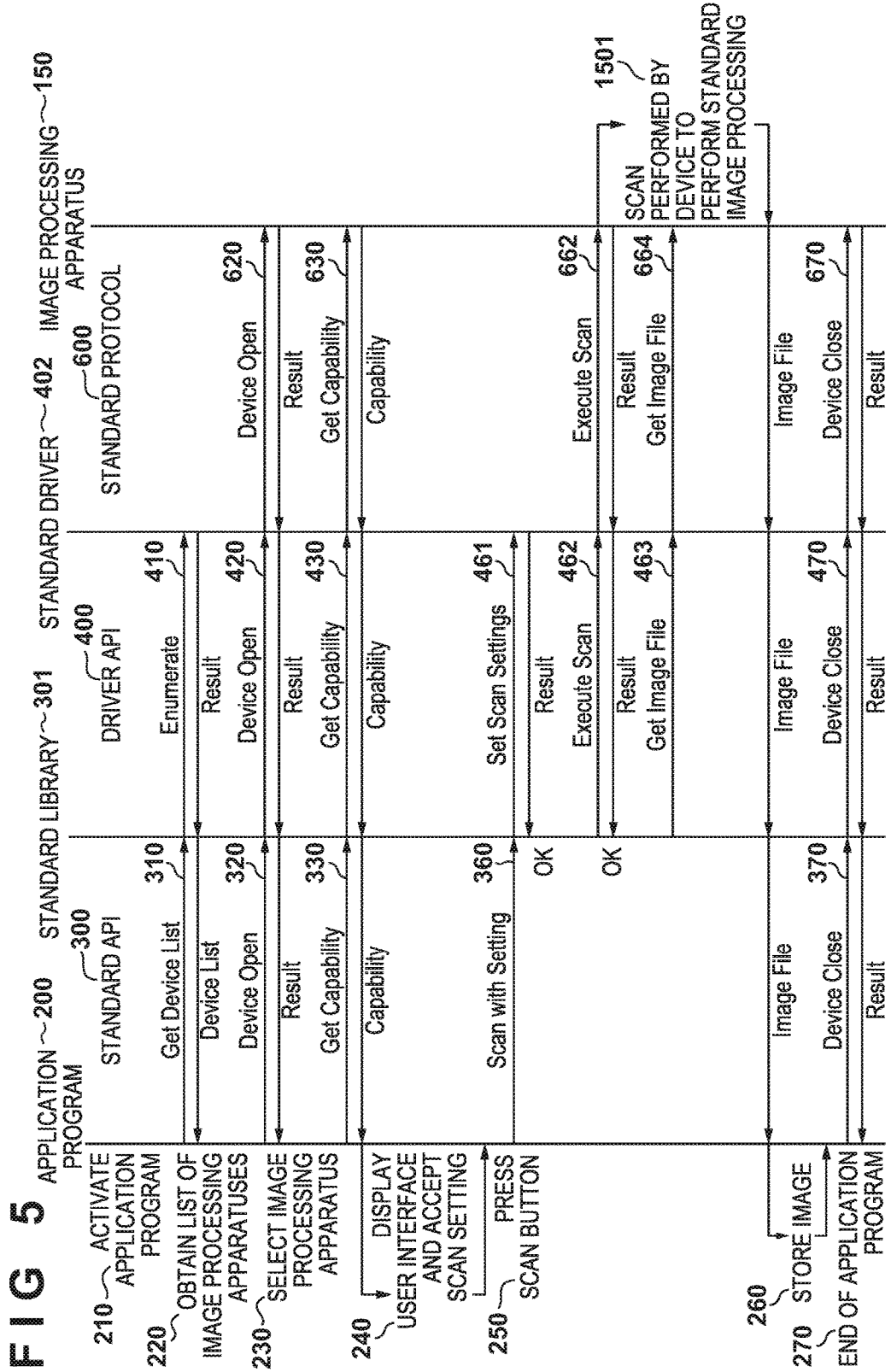
FIG. 5 is a sequence chart in use of the standard driver 402.

FIG. 5 is a data sequence concerning the basic operation of the application program 200 assuming the standard driver 402. FIG. 5 shows the overall sequence. In step 210, the user activates the application program 200. If activated, the application program 200 obtains a list of the image processing apparatuses 150 in step 220 and displays the list of the found image processing apparatuses 150. The user selects the image processing apparatus 150 to be scanned from the list in step 230. If the image processing apparatus 150 is selected, the application program generates and displays a user interface corresponding to the function of the image processing apparatus 150. If the user interface is displayed in step 240, the user sets a scan condition and presses a scan button in step 250. If the scan button is pressed, the application program 200 executes the scan and stores the scan result data in a file in step 260. The process returns to step 240, and a user interface corresponding to the function of the image processing apparatus 150 is displayed again. The user can repeatedly scan steps 240→250→260 by the necessary number of times. If the user obtains a desired result, the user ends the application program 200 in step 270.

The internal sequence from the application program 200 will be observed next. If obtainment of the list of the image processing apparatuses 150 is instructed in step 220, the application program 200 issues Get Device List 310 for the request of obtaining the list of the image processing apparatuses 150 as one of the standard APIs 300 for the standard library 301. By the Get Device List 310, the standard library 301 checks information registered in the USB or Network Service. If necessary, the Enumerate 410 as the list request is issued to the standard driver 402 to generate a list of the image processing apparatuses 150 and returns the list to the application program 200.

Subsequently, if the image processing apparatus 150 is selected in step 230, to obtain information of scan which can be made by the corresponding image processing apparatus 150, the application program 200 first issues Device Open 320 as one of the standard APIs 300 for declaring the start of use of the image processing apparatus 150. By the Device Open 320, the standard library 301 requests Device Open 420 to the standard driver 402. The standard driver 402 sends the request of Device Open 620 for occupying the image processing apparatus 150 and receives the request result. If the image processing apparatus 150 receives the Device Open 620, the image processing apparatus 150 checks whether an actual response can be made in response to the request. If possible, the image processing apparatus 150 returns OK to start preparation for the next command. If not possible, an error such as "busy" can be returned. The result is transferred to the application program 200 via the standard library 301.

If the image processing apparatus 150 can be opened, the application program 200 subsequently issues Get Capability 330, as one of the standard APIs 300 to check the function of the image processing apparatus 150, to check the function of the image processing apparatus 150. The Capability which can be obtained by the Get Capability 330 includes general information such as a resolution, a platen size, and the presence/absence of an ADF in the image processing apparatus 150. The Get Capability 330 is transferred from the standard library 301 to the standard driver 402 as Get Capability 430 and to the image processing apparatus 150 as Get Capability 630. The image processing apparatus 150 returns its own information as the Capability in accordance with the Get Capability 630. This information is finally transferred to the application program 200.

In step 240, the application program 200 creates and displays a user interface of a scan setting screen based on the obtained information (Capability). The user operates the user interface for scan setting to change values into desired set values. If the user presses the "scan" button of the user interface, the scan is started in step 250.

By the start of scan, the application program 200 issues Scan With Setting 360 of the scan request as one of the standard APIs 300. In response to this request, the standard library 301 issues Set Scan Settings 461. If response to this request is successful, the standard library 301 continuously issues Execute Scan 462. Execute Scan 662 is then issued to the image processing apparatus 150 to execute scan 1501. If the response to the Execute Scan 462 is successful, the standard library issues Get Image File 463 to the standard driver 402. In response to this, scan data Image File is obtained and transferred to the application program 200.

If the data is obtained, the application program 200 stores its data in a file in step 260. If the storage is successful, the application program 200 displays the user interface of the scan setting screen in step 240. The user repeatedly changes originals or settings several times until a desired scan is complete. The user repeats processes from step 240. If the user completes the scan, the application program 200 is complete in step 270. In step 270, to declare the end of use of the image processing apparatus 150 and allow another application program 200 to use the image processing apparatus 150, Device Close 370 as one of the standard APIs 300 is issued.

Sequence of Scan Processing Using Vendor Driver

Figure 6:
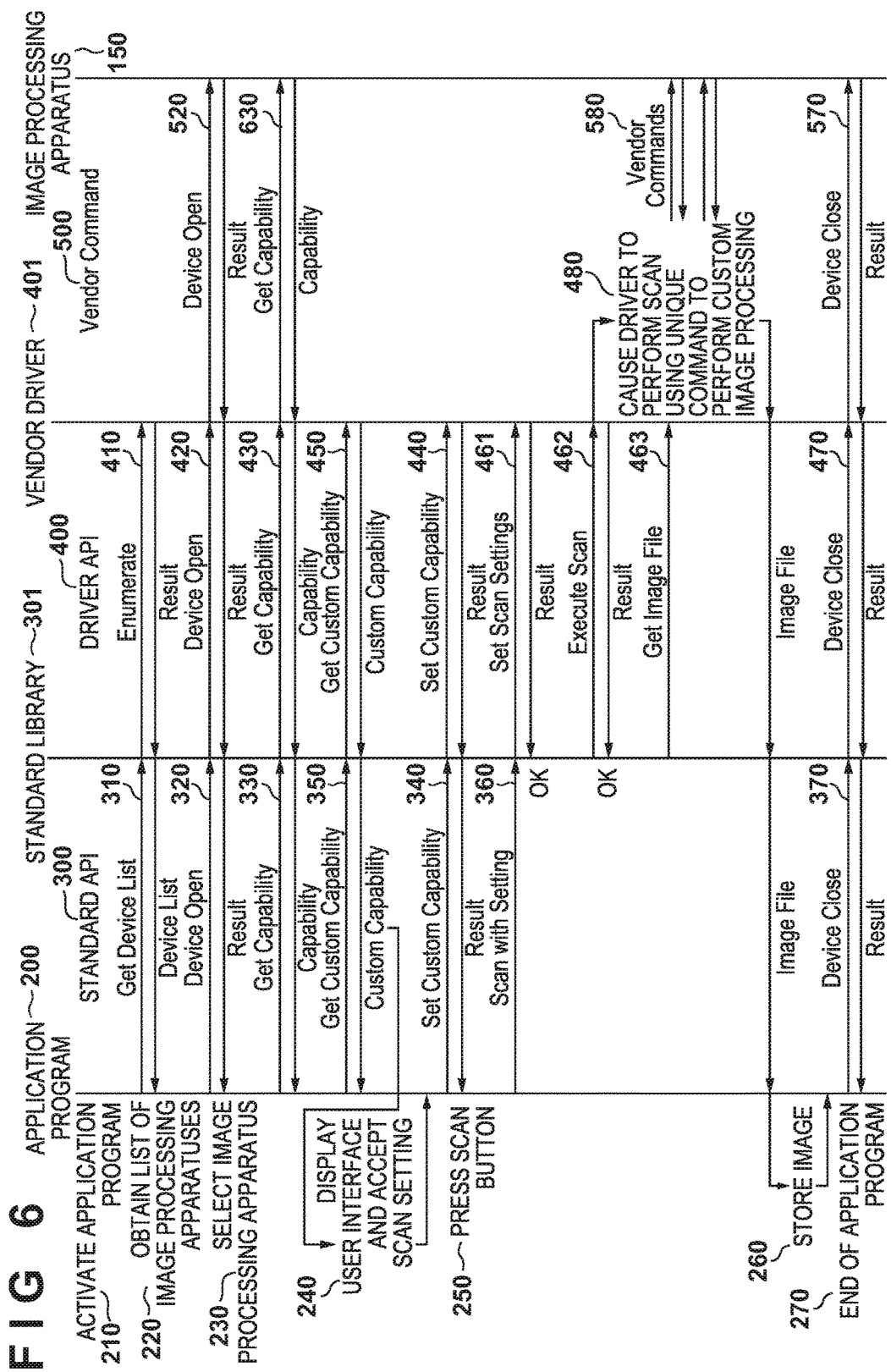
FIG. 6 is a sequence chart in use of the vendor driver 401.

FIG. 6 is a data sequence concerning the basic operation of the application program 200 assuming the vendor driver 401. There are three differences from the sequence of scan processing using the standard driver.

First, the application program 200 calls the Get Custom Capability 350 after the Get Capability 330. This function can obtain information concerning the internal function of the driver. For this reason, the application program 200 obtains this information such as information indicating the presence/absence of the image processing which is not defined in the standard driver or information indicating whether the scan method of the image processing which is not defined in the standard driver is possible. The application program 200 then reflects the above information on the user interface. The image processing (that is, image processing exceeding the standard image processing) which is not defined in the standard image processing is, for example, image processing which is not supported by the standard driver, that is, image processing not executed unless otherwise specified.

Second, the Set Custom Capability 340 is called before the normal scan operation after pressing the scan button in step 250. Accordingly, processing unique to the vendor obtained by the Get Custom Capability 350 is transmitted to the vendor driver 401, and the operation according to this unique processing can be performed. In some cases, the contents set by the normal method may be overwritten.

The final difference is a portion for actually controlling the scan to create an image. If the application program 200 executes the Scan With Setting 360, the vendor driver 401 executes unique processing 480 such as the use of a unique command 580 which is not executed by the standard driver 402 and image processing by the vendor driver 401 in accordance with the settings by the Set Custom Capability 340 and Set Custom Capability 440. If the standard driver 402 is used, the CPU 155 in the image processing apparatus 150 performs scan processing and image processing. On the other hand, if the vendor driver 401 is used, the vendor driver 401 basically controls the image processing apparatus 150. In some cases, the CPU 103 of the information processing apparatus 100 may performs all the control and image processing. Therefore, the image processing apparatus 150 can perform difficult complex image processing if the vendor driver 401 is used.

Standard Sequence Until User Interface Display

Figure 7:
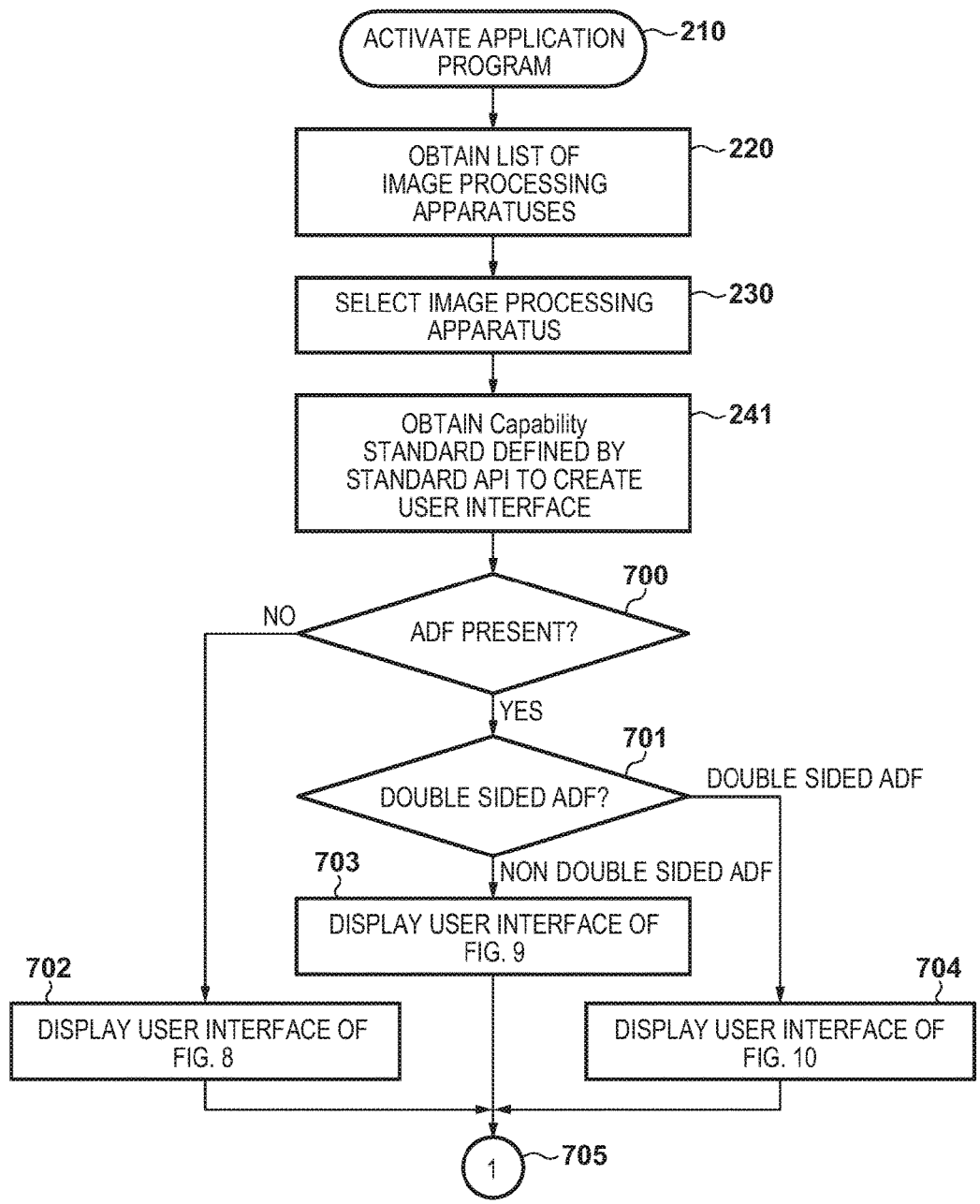
FIG. 7 is flowchart 1 of an application program 200.

FIG. 7 is a standard sequence until the application program displays the user interface. This sequence is common in the standard driver 402 and the vendor driver 401. If the application program is activated in step 210, an image processing apparatus list is obtained in step 220. If the image processing apparatus 150 is selected from the list in step 230, the Capability defined as the standard function in the standard API 300 is obtained from the selected image processing apparatus 150 in step 241. The user interface is constructed in accordance with the contents of the obtained Capability. Assume that pieces of information that are "presence/absence of ADF" and "whether double-sided ADF is used" are included in the standard-defined Capability.

Figure 8:
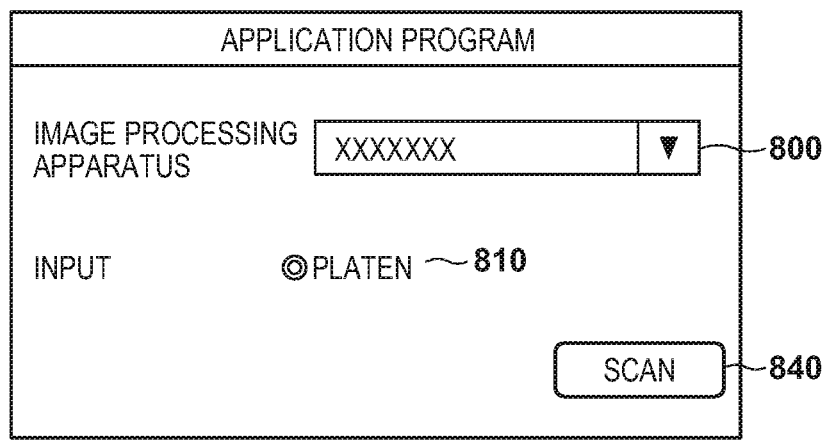
FIG. 8 is a view showing a user interface when only a platen glass is used.
Figure 9:
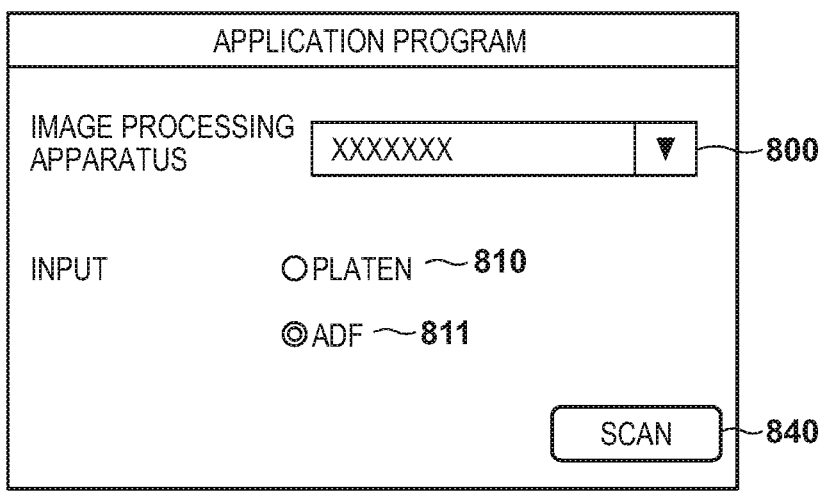
FIG. 9 is a view showing a user interface when an ADF is used.

First of all, the application program 200 determines the presence/absence of the ADF in step 700. If the ADF is absent, only the platen is used for scanning a document. In step 702, the application program 200 generates a user interface (FIG. 8) capable of selecting only a platen 810. If the ADF is present, it is determined in step 701 whether a double-side ADF can be used. If the double-sided ADF cannot be used, the application program 200 displays, in step 703, a user interface (FIG. 9) having a radio button capable of selecting one of the platen 810 and an ADF 811. If the double-sided AFD can be used, the application program 200 displays, in step 704, a user interface (FIG. 10) obtained by adding a double-sided check box 820 to the arrangement of FIG. 9. Since the image processing apparatuses 150 shown in FIGS. 8, 9, and 10 can be selected from a pop-up list, the image processing apparatuses can be re-selected. In this case, user interfaces for the re-selected image processing apparatuses can be displayed again by the above sequence. In addition, upon pressing a scan button 850, the pressing of the scan button in step 250 occurs.

Application Processing According to Scan Instruction

FIG. 17 shows processing when the application program 200 calls the scan of the standard API 300 upon pressing the scan button and obtains an image file. In step 1000, the application program 200 identifies whether the ADF is selected on the user interface. If not selected, the application program 200 selects the "platen" in step 1003. If the ADF is selected on the user interface in step 1000, it is identified in step 1001 whether the double-sided ADF is selected on the user interface. If the double-sided ADF is not selected, the "single-sided ADF" is selected in step 1003. If the double-sided ADF is selected, the "double-sided ADF" is selected in step 1004. The application program 200 calls the Scan with Settings of the standard API 300 in the selected setting. The selected setting information is transmitted to the standard driver 402 by the Set Scan Settings of the driver API 400 in step 1005. If the setting information is set for the standard driver 402, the start of scan is instructed using the Execute Scan of the driver API 400 in step 1006. After that, the Get Image File of the driver API 400 is called. This driver API 400 returns the result to the application program 200 at the end of scan. The application program performs subsequent processing if data obtainment is complete in step 1008.

When the application program 200 receives image data via the standard API 300, the application program 200 can detect accompanying information such as EXIF information if the image data is, for example a JPEG image. Examples of the information included in the accompanying information such as EXIF are the recording date and time of the image data, the vendor name and model name of the apparatus, a resolution, a color space, scan setting information, and a Custom Rendered tag. The Custom Rendered tag represents the function executed by the image processing apparatus and indicates, for example, the presence/absence of the image processing (or executed function) performed in the image processing apparatus. If the application program 200 requests a JPEG image and the image processing apparatus 150 generates JPEG image data and transmits it to the standard driver 402, the standard library 301 transfers the JPEG image data generated by the image processing apparatus 150 to the application program 200 intact. The application program 200 can determine processing supported by the application program 200 based on the characteristic of the image processing apparatus 150 obtained from the EXIF information of the JPEG image data. For example, the application program 200 can determine whether image processing is possible for the obtained JPEG data by using the Custom Rendered tag defined generally by the EXIF information embedded in the JPEG data generated by the image processing apparatus 150.

Generation Processing of Scan Result by Image Processing Apparatus

FIG. 16 is a sequence when the image processing apparatus 150 generates a scan result. If the image processing apparatus 150 receives, in step 900, a scan request from the standard driver 402 via the standard protocol 600, the image processing apparatus 150 determines in step 901 whether EXIF information is output to this request. This determination can be made in accordance with whether the EXIF information is output if the request is a request from a specific OS, whether the EXIF information is output in accordance with the designation of a file format, or whether the image processing apparatus 150 is a model corresponding to the subsequent function. If it is determined in step 901 that the EXIF information is output, it is identified in step 902 whether specific processing which influences the tag is performed, for example, image processing which cannot stand additional processing is performed for the scanned image data. In this case, the specific processing is processing for determining whether edge enhancement is performed. The designation of the edge enhancement processing from a driver is performed by a unique command if the driver is, for example, the vendor driver 401. On the other hand, if the driver is the standard driver 402, no edge enhancement is performed because it is not a standard function. When the application program 200 performs edge enhancement again after the image processing apparatus 150 performs edge enhancement to perform image correction, the edge enhancement is excessive and disturbs the image. For this reason, if it is determined in step 902 whether the edge enhancement is ON, the image processing apparatus 150 adds the Custom Rendered tag to the added EXIF information and set its value to 1 (Custom). If it is determined in step 902 whether the edge enhancement is OFF, the image processing apparatus 150 adds the Custom Rendered tag to the added EXIF information and set its value to 0 (Normal).

The Custom Rendered tag in the EXIF information indicates that special image processing has been performed. If its value is 1, it serves as a flag for inhibiting further image processing. The application program 200 determines that it can perform image processing for the scan result (image data) from the image processing apparatus 150 in which the Custom Rendered tag is set to 0. The application program 200 can apply unique image processing. On the other hand, the application program 200 determines that the image data from the image processing apparatus 150 in which the Custom Rendered tag is set to 1 has already undergone image processing. The application program 200 then inhibits the subsequent unique image processing and disables user selection of the image processing. If the Custom Rendered tag itself is not present, whether the application program 200 performs image processing is unknown. In this case, it may be determined whether another method is used to perform image processing of the scan image file of the corresponding image processing apparatus 150. Alternatively, if no determination method is available, the application program 200 performs processing such that the image processing cannot be made.

Reception Processing of Scan Image Data by Application

The implementation in the application program 200 will be described with reference to FIG. 11. The application program 200 performs processing by the Capability of the standard API 300 in FIG. 7 and then obtains data by the standard API 300, as shown in step 710 of FIG. 11. The scan setting at this time is an arbitrary size or resolution. It is necessary to obtain not the image but the data accompanying information. For this reason, the scan can be performed at a minimum size which does not cause a scan error. No problem is posed even if desired information is embedded only when the scan is performed with the specific setting or even if the accompanying information is embedded in the image itself. To check EXIF information, it is necessary to designate JPEG data. If any accompanying information is obtained for a format except the JPEG format, any format can be used.

Figure 11:
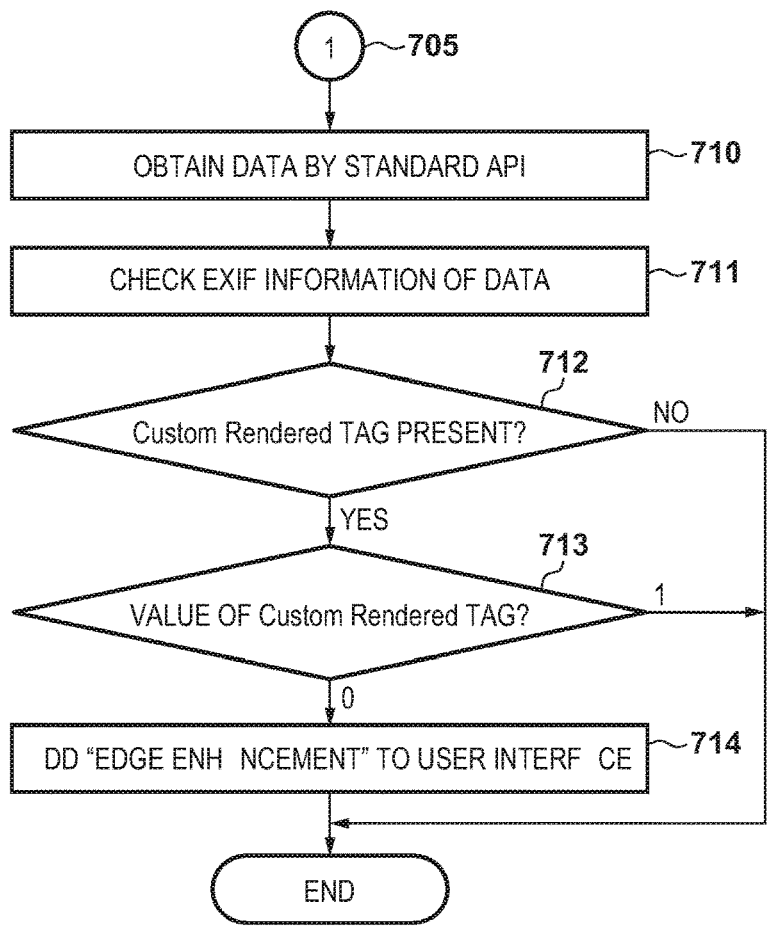
FIG. 11 is flowchart 2 of the application program 200.

In FIG. 11, the application program 200 obtains a JPEG header in step 711 to obtain EXIF information from the JPEG tag. Subsequently, in step 712, the application program 200 checks whether a Custom Rendered tag is present in the EXIF tag. If not, since whether this image is processed is unknown, the control for designating the "edge enhancement" as the image processing does not display a user interface for safety. If the Custom Rendered tag is present, the application program 200 checks its value in step 713. If the value of the Custom Rendered tag is 1, the image processing apparatus 150 inhibits image processing. For this reason, the application program 200 does not display the designation of the "edge enhancement" processing as the image processing on the user interface. If the value of the Custom Rendered tag is 0, image processing on the information processing apparatus 100 side is allowed. In step 714, the application program 200 adds designation of "edge enhancement" to the user interface.

Figure 10:
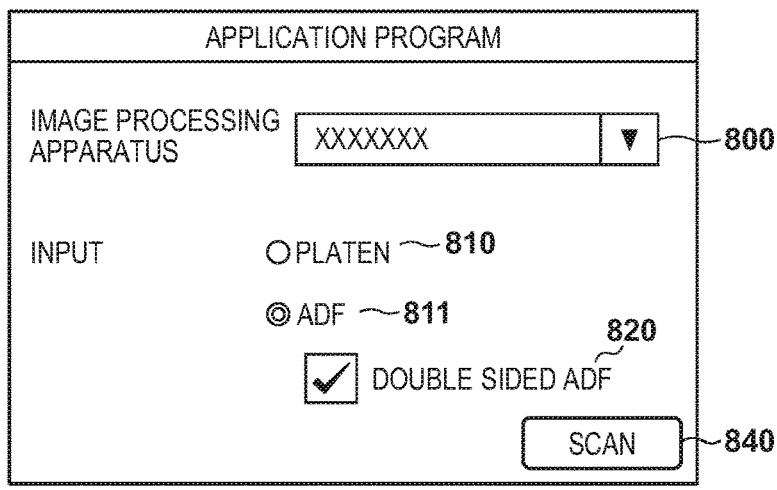
FIG. 10 is a view showing a user interface when a double-sided ADF is used.
Figure 12:
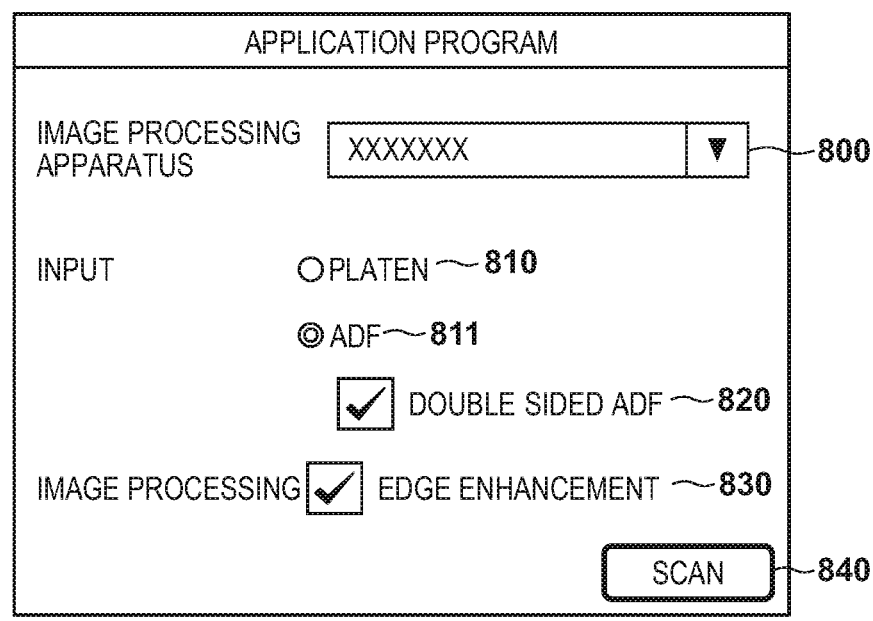
FIG. 12 is a view showing a user interface with image processing.

FIG. 12 shows the state in which the user interface shown in FIG. 10 is created by the Capability of the standard API 300. This user interface is obtained when the application program 200 adds an edge enhancement 830 by processing in step 714 in FIG. 11. In addition to FIG. 10, the application program 200 can create the user interface to which the "edge enhancement" is added by the processing in step 714 in FIGS. 8 and 9. In addition to a selection field 800 for selecting one of the plurality of image processing apparatuses, the user interface includes a selection portion for selecting the image processing apparatus 150 such as a platen glass, an ADF, and double-sided scan and a function obtained from a driver, and a selection portion 830 for the edge enhancement function determined based on the Custom Rendered tag.

Processing Sequence from Activation to End of Application

Figure 13:
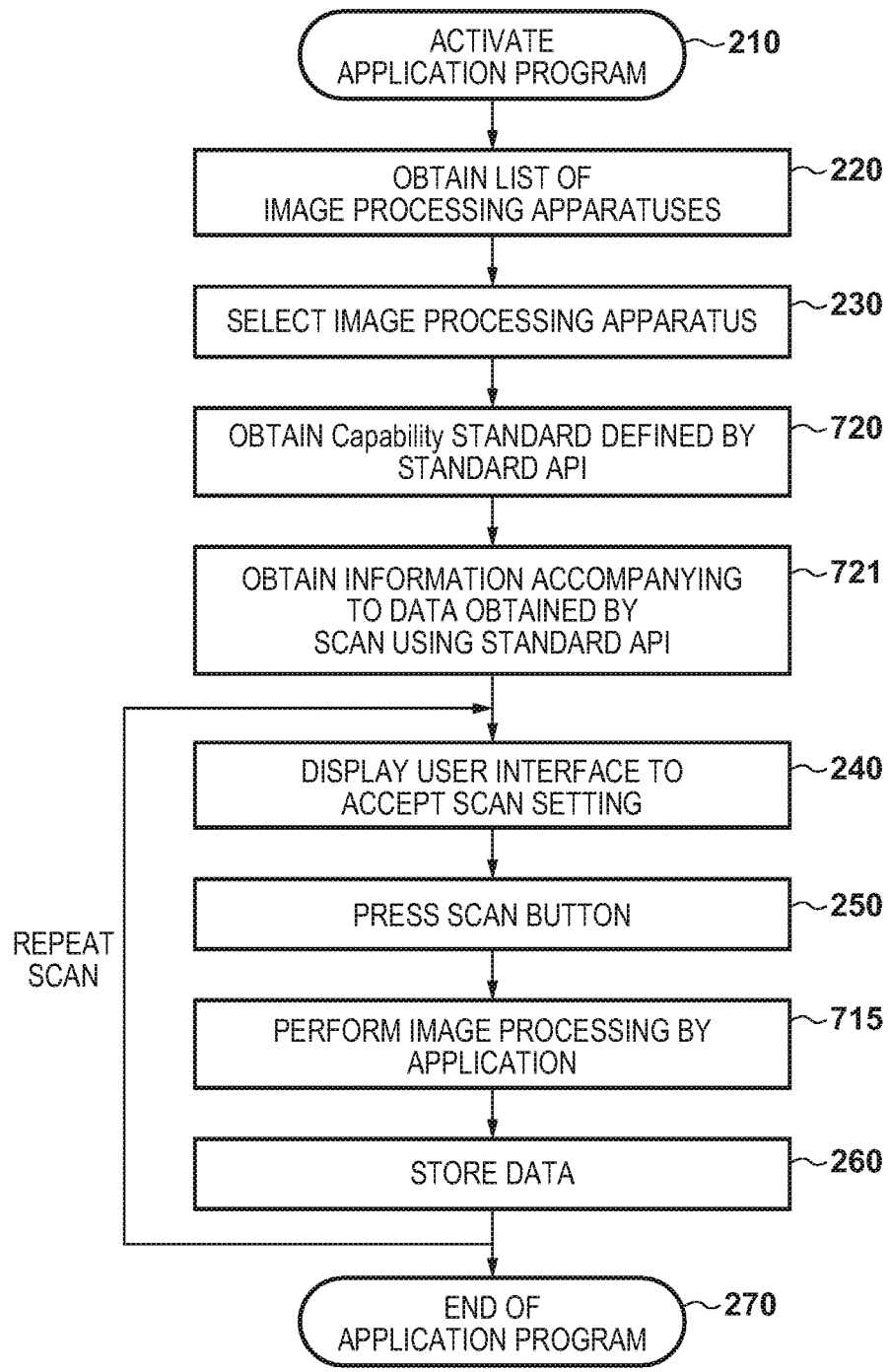
FIG. 13 is flowchart 3 of the application program 200.

FIG. 13 is a flowchart from the activation to end of the application program 200. First, in step 210, if the application program 200 is activated, the application program 200 obtains the list of the image processing apparatuses 150 using the standard API 300, displays it, and prompts the user to select the desired image processing apparatus 150 in step 220. When the user selects the image processing apparatus 150 in step 230, the application program 200 opens the image processing apparatus 150 using the standard API 300 to obtain the Capability of the image processing apparatus 150 using the standard API 300 (step 720). In step 721, the application program 200 performs scan by a standard method using the standard API 300 and uses the accompanying information in the received data to determine processing capable of being performed by the application program 200. More specifically, the accompanying information of this example indicates the value of the Custom Rendered tag returned together with the image data by the image processing apparatus 150, as described with reference to FIG. 16.

The application program 200 generates and displays the user interface (for example, the user interface shown in FIG. 10 or 12) and accepts an input from the user in step 240 based on the information in steps 720 and 721. For example, if the value of the Custom Rendered tag is 1, the edge enhancement setting is not accepted on this user interface. If the value of the Custom Rendered tag is 0, the edge enhancement setting is accepted. If the user presses the "scan" button in the user interface in step 250, the application program 200 receives the data from the image processing apparatus 150 in accordance with the standard method using the standard API 300 based on the value set in the user interface. If the user designates the "edge enhancement" in the user interface, the application program 200 performs image processing on the data in step 715. If the user does not designate the "edge enhancement" or the designation itself cannot be made, the data is not processed. In step 260, the application program 200 stores the data and ends the scan operation. The user may repeats the user interface setting in step 240 to the storage of the scan data in step 260, as needed. If the desired scan is complete, the user selects the end in step 270, thereby ending the operation of the application program 200.

As described above, in this embodiment, by using even the standard driver, the application can know that processing exceeding the standard processing has been performed in the image processing apparatus. The processing exceeding the standard processing includes, for example, the edge enhancement, but may be another processing except the standard processing. Any image processing which is non-standard processing such as inversion and rotation of an image, blurring, noise addition, noise reduction, an unsharp mask, a custom filter, a special effect, color correction, and the like can be a candidate. Since the application can know the image having undergone non-standard image processing by using the value of the Custom Rendered tag, the application can perform appropriate processing, thereby making the image processing in the image processing apparatus such as a scanner compatible with the image processing by the application.

Second Embodiment

Figure 14:
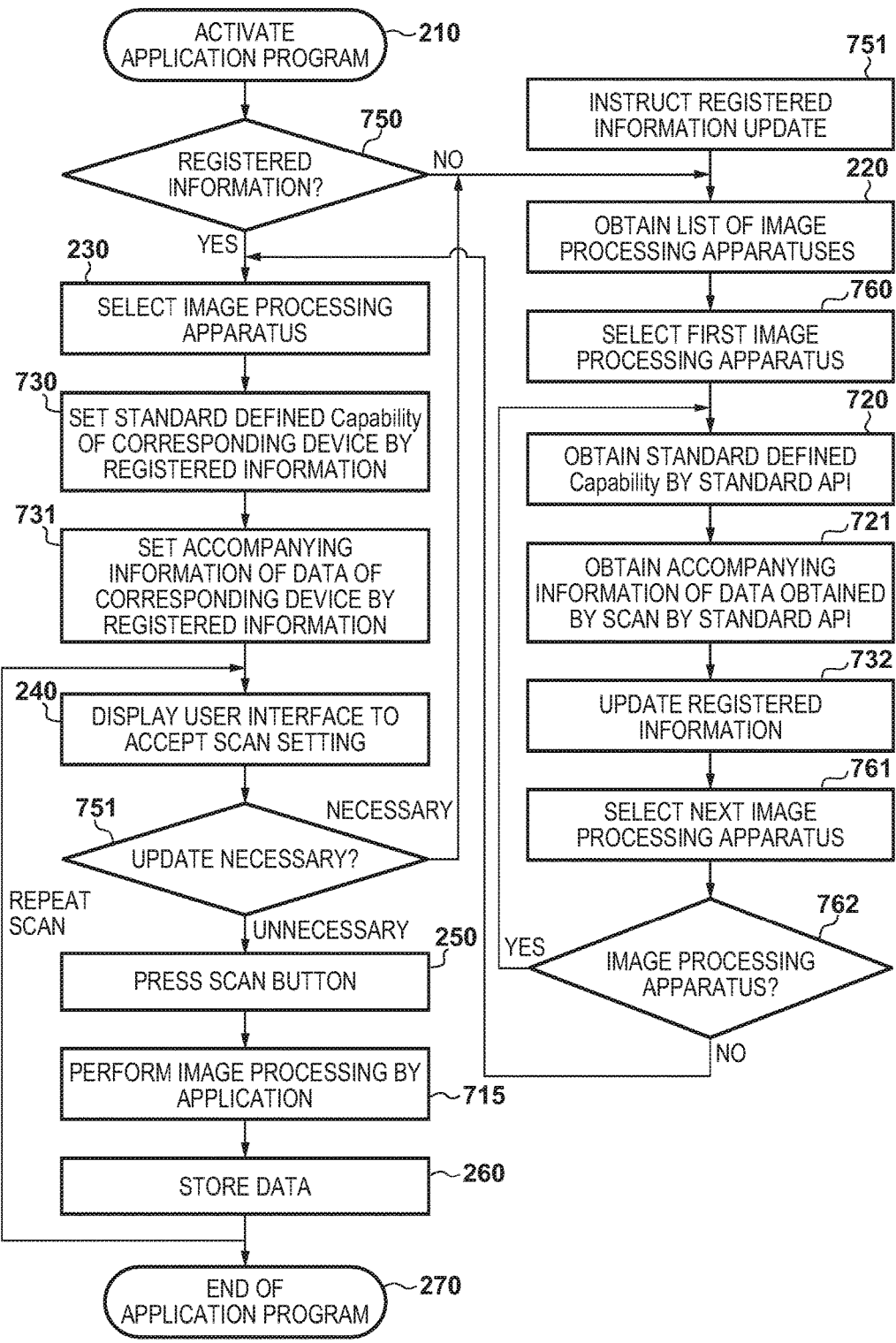
FIG. 14 is flowchart 4 of the application program 200.

In the above embodiment, since the user performs a scan operation for knowing the characteristic of an unintended image processing apparatus 150 every time the user selects an image processing apparatus 150, it takes time for the method in FIG. 13 until a user interface is displayed. The Custom Rendered tag has a feature that the same value is always set in the tag unless an option for instructing the change in image processing on the image processing apparatus 150 side is set. In the second embodiment, by using this characteristic, the previously obtained information is stored in association with the identification information of the image processing apparatus, and the information (to be referred to as registered information) stored when the same image processing apparatus 150 as the image processing apparatus 150 at the time of selecting the image processing apparatus 150 having the above identification information is present is used to quickly select the second or subsequent image processing apparatus 150. In this case, it is difficult to update the registered information to correct registered information when the selection information of the image processing apparatus 150 is replaced with that of the image processing apparatus 150 having the same user name but a different characteristic. This also applies when the firmware of the image processing apparatus 150 is updated to change the function. The second embodiment is different from the first embodiment in that FIG. 13 is replaced with FIG. 14 and FIG. 12 is replaced with FIG. 15, and the rest of the second embodiment is the same as the first embodiment. Only different points will be described below.

Processing Sequence from Activation to End of Application (Second Example)

FIG. 14 is a flowchart of an application program 200 capable of performing intended "information update concerning the image processing apparatus 150" so that the user can cope with even a case in which the information of the image processing apparatus 150 is changed. Although a method of updating each image processing apparatus can be considered, a method of collectively registering and updating the image processing apparatuses 150 is provided in FIG. 14. Upon activation, the application program 200 determines in step 750 whether the registered information of the previously obtained image processing apparatus 150 is present with reference to its own preference file. At the time of initial activation, since no registered information of the image processing apparatus 150 is present, the result of step 750 is determined to be "NO". If "NO" in step 750, the application program 200 obtains the list of the image processing apparatuses 150 in step 220. The result is not directly presented to the user, but is held in the registered information upon obtaining the Capability of the image processing apparatus 150. Even if listing is present in the list of the image processing apparatuses 150 of a standard API 300, a communication error occurs to disable registration when the image processing apparatus 150 cannot be accessed due to the busy state of another information processing apparatus 100.

In order to sequentially register the image processing apparatuses 150 in the list of the image processing apparatuses 150 obtained in step 220, the application program 200 internally selects the first image processing apparatus 150 in step 760. If the image processing apparatus 150 is selected, the application program 200 obtains the standard-defined Capability by the standard API 300 in step 720. In step 721, the application program 200 causes the selected image processing apparatus to perform scan using the standard API 300 to obtain image data, thereby obtaining accompanying information (for example, the Custom Rendered tag). The image data and the accompanying information are the same as in steps 720 and 721 in FIG. 13. If the obtainment of the pieces of information is successful, the application program 200 adds these pieces of information to the registered information of the image processing apparatuses 150 or updates them in step 732. In step 761, the application program 200 selects the next image processing apparatus 150 and repeats the processing from step 720. In step 762, the application program 200 returns the processing to the selection of the image processing apparatus 150 unless any other image processing apparatus 150 is present.

Figure 15:
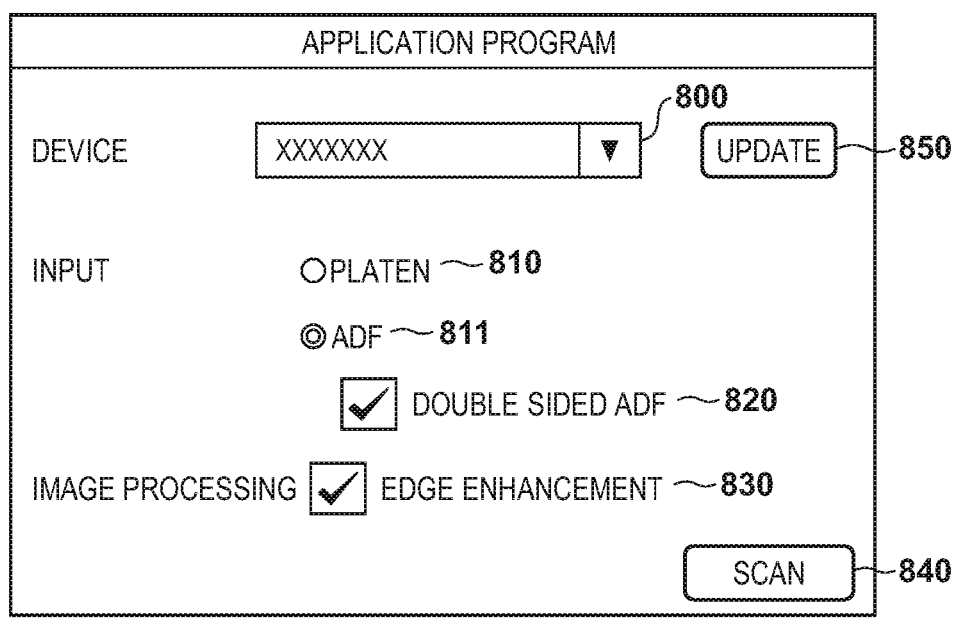
FIG. 15 is a view showing a user interface with an update button.

If it is determined in step 750 that the registered information is present, an image processing apparatus is selected in step 230. If the image processing apparatus 150 is selected, it is guaranteed that the registered information of the selected image processing apparatus has already been obtained. At the time of selection of the image processing apparatus 150, the application program 200 extracts, in step 730, the standard-defined Capability stored in step 732 and obtained by the standard API 300. In step 731, the obtained information is extracted from the data stored in step 732 and obtained by the standard API 300, and a user interface shown in FIG. 15 is displayed based on the extracted information in step 240.

If the function improvement of the image processing apparatus 150, replacement due to the same name, and addition of the image processing apparatus 150 are performed, the user must update the registered information of the image processing apparatus 150 whose processing is started from step 220 in FIG. 14. FIG. 15 shows an interface obtained by adding an update button 850 to update the registered information. It is determined in step 751 whether the user presses the update button 850 as an instruction portion for instructing the update. If pressed, a series of processes started from step 220 is started because the registered information update instruction for the image processing apparatus 150 has been made. Accordingly, the application program 200 can cope with even a case in which the image processing apparatus 150 is added or updated without every scan for obtaining the information in the same image processing apparatus 150.

In addition to acceptance of the pressing of the update button 850, the application program 200 also determines in step 751 whether the selected image processing apparatus 150 can use the same information as the stored registered information. In this case as well, if the application program 200 determines in step 751 that the selected image processing apparatus 150 is different from the registered image processing apparatus 150, the process branches to step 220 to update the registered information of the selected image processing apparatus 150. Whether the selected image processing apparatus is identical to the registered image processing apparatus can be determined by using the model ID of the image processing apparatus 150, the firmware version, the series number, and the UUID number singly or in combination. If the application program determines the necessity of update, processing from step 220 is internally called and executed to display a correct user interface of the selected image processing apparatus 150. Processing from step 250 is the same as in FIG. 13.

By the above sequence, every time an image processing apparatus is selected, the function information is obtained from the selected image processing apparatus. In addition, non-standard image processing information (for example the Custom Rendered tag) indicating whether non-standard image processing has been performed is obtained. Once these pieces of information are obtained, they are registered as the image processing apparatus information. Accordingly, every time an image processing apparatus is selected, the above information need not be obtained, thereby quickly performing processing and reducing the load of the image processing apparatus. In addition, as in the first embodiment, the application can know whether image processing can be performed for the image data obtained by the selected image processing apparatus regardless of the standard driver or the vendor driver as a driver to be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-119890, filed Jun. 19, 2017, which is hereby incorporated by reference herein in its entirety.

What is claimed is:

1. An information processing apparatus which is connected to an image processing apparatus that transfers, to a request source, image data and accompanying information related to a function executed by the image processing apparatus, the information processing apparatus comprising a processor and a memory,
  wherein the memory stores a program, and the processor executes the program and functions as
  an obtaining unit configured to obtain first image data and the accompanying information from the image processing apparatus via a standard driver, wherein the accompanying information indicates whether or not a non-standard function which is not supported by the standard driver is executed by the image processing apparatus, and a user interface unit configured to provide a user interface, based on the accompanying information, wherein the user interface includes a selection portion for selecting by a user a function to be executed by the information processing apparatus on second image data obtained from the image processing apparatus, and in a case where the accompanying information indicates that the non-standard function which is not supported by the standard driver is executed by the image processing apparatus, the user interface unit provides a user interface in which a selection in the selection portion of the non-standard function which is not supported by the standard driver executed by the image processing apparatus is inhibited.

2. The apparatus according to claim 1, wherein if no accompanying information is present in the obtained image data, the user interface unit provides the user interface in which a selection in the selection portion of the non-standard function which is not supported by the standard driver is inhibited.

3. The apparatus according to claim 1, wherein
the processor executes the program and further functions as a second obtaining unit configured to obtain function information indicating a function provided by the image processing apparatus and a driver thereof, and
the user interface further includes a selection portion configured to select the function indicated by the function information.

4. The apparatus according to claim 3, wherein
the accompanying information and the function information are stored in association with the image processing apparatus, and
the user interface further includes a selection portion configured to select one of a plurality of image processing apparatuses, and if the accompanying information and the function information associated with the selected image processing apparatus are stored, the user interface includes a selection portion corresponding to the stored accompanying information and the stored function information.

5. The apparatus according to claim 4, wherein
the user interface further includes an instruction portion configured to re-obtain and update the stored accompanying information and the stored function information, and
if an instruction is made from the instruction portion, the user interface unit re-obtain and update the stored accompanying information and the stored function information by obtaining the accompanying information and the function information by the obtaining unit and the second obtaining unit.

6. The apparatus according to claim 1, wherein a function indicated by the accompanying information includes edge enhancement.

7. The apparatus according to claim 1, wherein the image processing apparatus comprises a scanner configured to read an image.

8. The apparatus according to claim 1, wherein the obtaining unit and the user interface unit are implemented by an application program executed by the processor.

9. The apparatus according to claim 1, wherein if the accompanying information is first information, the user interface unit provides the user interface in which selection in the selection portion of the non-standard function is inhibited, and
if the accompanying information is second information, the user interface unit provides a user interface in which the inhibiting is not performed.

10. The apparatus according to claim 1, wherein the processor executes the program and further functions as a determining unit configured to determine whether the non-standard function is executed by the image processing apparatus or not,
wherein the user interface unit provides the user interface in which selection in the selection portion of the non-standard function is inhibited, in a case where it is determined that the non-standard function is executed by the image processing apparatus.

11. The apparatus according to claim 1, wherein the first image data is JPEG image data and the accompanying information comprises an EXIF tag of the JPEG image data.

12. The apparatus according to claim 1, wherein
the processor executes the program and further functions as a third obtaining unit configured to obtain the second image data from the image processing apparatus, after the function executed by the information processing apparatus is selected in the selection portion, and
an executing unit configured to execute the function selected in the selection portion, on the second image data obtained by the third obtaining unit.

13. A method which is performed by an information processing apparatus which is connected to an image processing apparatus that transfers, to a request source, image data and accompanying information related to a function executed by the image processing apparatus, the method comprising:
obtaining the first image data and the accompanying information from the image processing apparatus via a standard driver, wherein the accompanying information indicates whether or not a non-standard function which is not supported by the standard driver is executed by the image processing apparatus, and
providing a user interface based on the accompanying information,
wherein the user interface includes a selection portion for selecting by a user a function to be executed by the information processing apparatus on second image obtained from the image processing apparatus, and
in a case where the accompanying information indicates that the non-standard function which is not supported by the standard driver is executed by the image processing apparatus, the user interface unit provides a user interface in which a selection in the selection portion of the non-standard function which is not supported by the standard driver executed by the image processing apparatus is inhibited.

14. The method according to claim 13, wherein if no accompanying information is present in the obtained image data, a selection in the selection portion of the non-standard function which is not supported by the standard driver is inhibited in the user interface.

15. The method according to claim 13, further comprising
obtaining function information indicating a function provided by the image processing apparatus and a driver thereof, and
wherein the user interface unit further includes a selection portion configured to select the function indicated by the function information.

16. The method according to claim 15, wherein
the accompanying information and the function information are stored in association with the image processing apparatus, and
the user interface further includes a selection portion configured to select one of a plurality of image processing apparatuses, and if the accompanying information and the function information associated with the selected image processing apparatus are stored, the user interface includes a selection portion corresponding to the stored accompanying information and the stored function information.

17. The method according to claim 16, wherein
the user interface further includes an instruction portion configured to re-obtain and update the stored accompanying information and the stored function information, and the method further comprises
if an instruction is made from the instruction portion, re-obtaining and updating the stored accompanying information and the stored function information by obtaining the accompanying information and the function information.

18. The method according to claim 13, wherein a function indicated by the accompanying information includes edge enhancement.

19. The method according to claim 13, wherein the image processing apparatus comprises a scanner configured to read an image.

20. The method according to claim 13, wherein the obtaining and the user interface are implemented by an application program executed by the information processing apparatus.

21. An information processing system comprising an image processing apparatus and an information processing apparatus using the image processing apparatus, wherein
the image processing apparatus includes a transmission unit configured to transmit, to a request source, image data and accompanying information related to a function executed by the image processing apparatus, and
the information processing apparatus includes
an obtaining unit configured to obtain first image data and the accompanying information from the image processing apparatus via a standard driver, wherein the accompanying information indicates whether or not a non-standard function which is not supported by the standard driver is executed by the image processing apparatus, and a user interface unit configured to provide a user interface, based on the accompanying information,
wherein the user interface includes a selection portion for selecting by a user a function to be executed by the information processing apparatus on second image data obtained from the image processing apparatus, and
in a case where the accompanying information indicates that the non-standard function which is not supported by the standard driver is executed by the image processing apparatus, the user interface unit provides a user interface in which a selection in the selection portion of the non-standard function which is not supported by the standard driver executed by the image processing apparatus is inhibited.

22. A non-transitory computer-readable storage medium storing a program, wherein if the program is executed by an information processing apparatus which is connected to an image processing apparatus that transfers, to a request source, image data and accompanying information related to a function executed by the image processing apparatus, the program causes the information processing apparatus to function as
an obtaining unit configured to obtain first image data and the accompanying information from the image processing apparatus via a standard driver, wherein the accompanying information indicates whether or not a non-standard function which is not supported by the standard driver is executed by the image processing apparatus, and
a user interface unit configured to provide a user interface, based on the accompanying information,
wherein the user interface includes a selection portion for selecting by a user a function to be executed by the information processing apparatus on second image data obtained from the image processing apparatus, and
in a case where the accompanying information indicates that the non-standard function which is not supported by the standard driver is executed by the image processing apparatus, the user interface unit provides a user interface in which a selection in the selection portion of the non-standard function which is not supported by the standard driver executed by the image processing apparatus is inhibited.

* * * * *